UNITED STATES PATENT OFFICE.

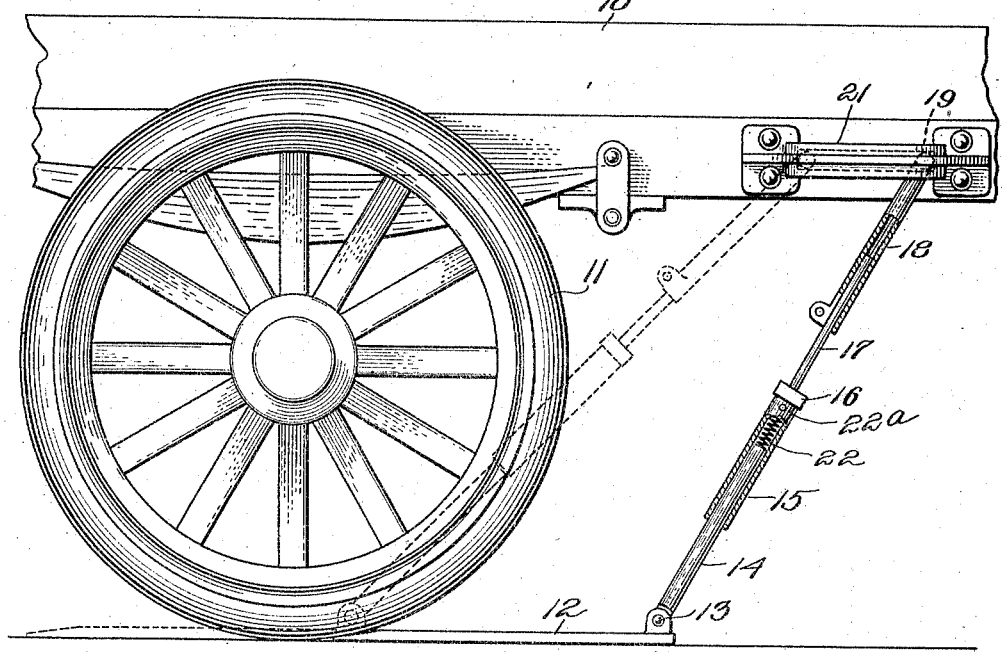
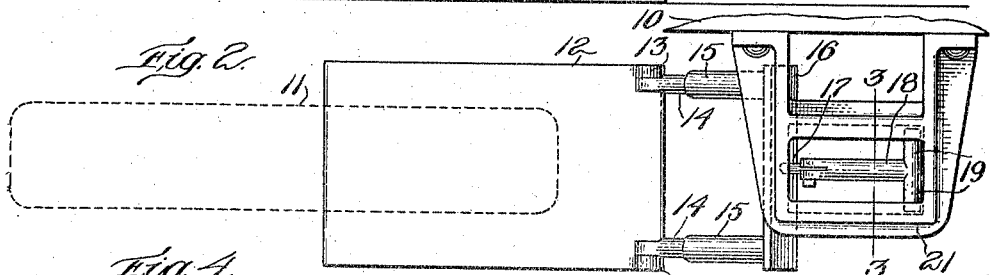
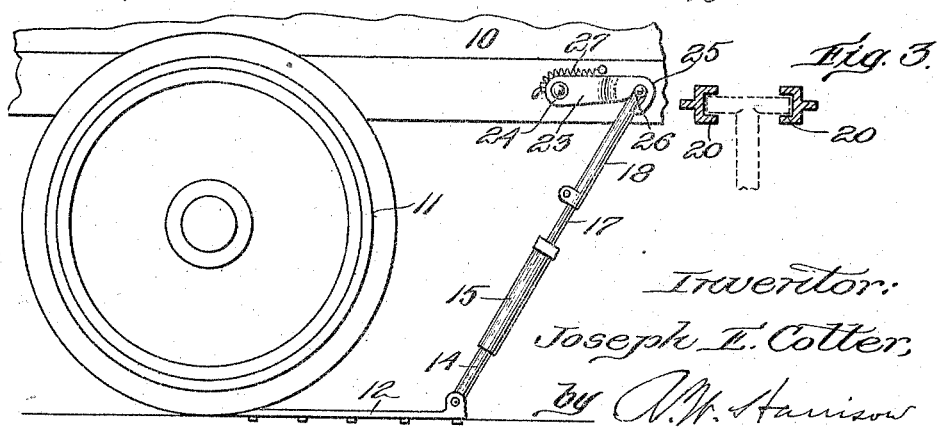

JOSEPH E. COTTER, OF WEST SOMERVILLE, MASSACHUSETTS.

STARTING DEVICE FOR MIRED MOTOR-VEHICLES.

1,307,851. Specification of Letters Patent. Patented June 24, 1919.

Application filed June 10, 1918. Serial No. 239,235.

*To all whom it may concern:*

Be it known that I, JOSEPH E. COTTER, a citizen of the United States, and resident of West Somerville, in the county of Middlesex and State of Massachusetts, have invented certain new and useful Improvements in Starting Devices for Mired Motor-Vehicles, of which the following is a specification.

This invention relates to means for extricating motor vehicles when mired in mud, snow, slush, loose sand, etc., and refers especially to devices capable of being used in connection with one of the driving wheels of the vehicle so that the latter may get a sufficient purchase or grip to effect a start of the machine for a distance to enable the machine to be then operated in the ordinary manner.

One of the objects of my invention is to provide an attachment which may be ordinarily carried in the motor vehicle and which, when applied to position for use, will be automatically pushed in a direction to tend to insert a shoe or thin platform between the driving wheel and the ground.

Another object is to provide a device of the character mentioned which will automatically separate after the vehicle has started, so as to leave the plate or thin platform on the ground to be then freely and quickly picked up and restored to place in the vehicle.

With these and other objects in view my invention consists in the construction and combination of parts substantially as hereinafter described and claimed.

Of the accompanying drawings:—

Figure 1 is a side elevation of a portion of a motor truck, with my improved attachment (partly broken out) in full and dotted line positions.

Fig. 2 is a plan view of my improved attachment and indicating also a portion of the body of the vehicle and one of the driving wheels.

Fig. 3 represents a section on line 3—3 of Fig. 2.

Fig. 4 is a side elevation illustrating a modification hereinafter described.

A portion of the body of a motor vehicle, which may be either a motor truck or pleasure car, is indicated at 10, one of the driving wheels being indicated at 11.

Referring first to Figs. 1, 2 and 3, a thin flat platform or shoe 12, which may have either or both of its surfaces studded or otherwise roughened, as indicated in Fig. 4, is pivotally connected at 13 to the lower ends of two arms 14. The upper ends of the arms 14 are slidingly engaged with the tubular members 15 of a fork the upper member or cross-piece 16 of which is provided with a stem 17 which is adjustably clamped in a tubular rod 18 the upper end of which has branches 19 slidingly engaged with ways 20 (Fig. 3) formed in a bracket 21 which is suitably secured to one side of the body 10 of the vehicle.

Located in the tubular members 15 of the fork, above the upper ends of the arms 14, are springs 22, said springs being secured in the tubular members as by having their upper ends projecting through holes in the tubular members as indicated at 22ª in Fig. 1. The springs 22 are not connected with the arms 14 but are so formed and proportioned as to exert a tendency to thrust the arms 14 down and out of the tubular members 15. Preferably springs 22 will be such that when the arms 14 are entirely out of the tubular members 15, the lower ends of the springs will still be somewhat within the said tubular members. In other words the springs are not intended to at any time project out of the tubular members.

The object of the stem 17 clamped in the tubular rod 18 is simply to provide for longitudinal adjustment so as to vary the effective length of the link as a whole, said link comprising all of the parts which connect the shoe 12 with the bracket 21.

All of the parts excepting the bracket 21 and its ways are to be carried in the vehicle. When the latter is mired and it is desired to extricate the same, the operator takes the attachment including the shoe and the link and connects the latter to the bracket by turning it somewhat so that the two branch 19 can be passed up through the opening between the ways and then turns the branches 19 so that the ends of the latter will be located in the ways as indicated in Fig. 3. If the arms 14 have slipped out from the tubular members 15, they will then be inserted and pushed in so as to compress the springs. When the free edge of the shoe is then put in such position as indicated by full lines in Fig. 1, the springs 22 exert a constant tendency to push the shoe between the wheel and the ground. The car will then be started and the springs keep the shoe closely up to the wheel until the operation of the motor forces the wheel on to the shoe. As the car moves forward the springs 22 expand. As the wheel rides on to the shoe there is a tendency to draw the arms 14 out from the tubular members 15 but if they should not be drawn entirely out by friction they will soon be positively pulled out as soon as the forward movement of the vehicle causes the branches 19 of the link to reach the rear ends of the way 20 as indicated by dotted lines in Fig. 1. After this any further movement of the vehicle will cause the entire separation of the shoe and its pivoted arms 14 from the rest of the attachment so that no damage can result regardless of how far the vehicle travels before the operator stops it. When the parts have separated the fork and its stem 17 simply swings down freely and the operator can pick up the shoe and its arms and can detach the fork and its stem from the bracket 21 by simply turning the parts enough to enable the ends of the branches 19 to be disconnected from the ways.

If desired the ends of the branches 19 might be provided with rolls but such are not essential. The attachment will serve its purpose in connection with but one driving wheel.

Of course, if the body of the vehicle carries another bracket 21 at the rear of the driving wheel 11, the same attachment can be used to extricate the machine from its mired condition by a backward operation instead of forward.

Referring to Fig. 4 it is to be supposed that the parts having the same reference characters as those employed in Fig. 1 will have the same construction excepting that with the structure shown in Fig. 4 it is not essential that the springs 22 be employed. In said Fig. 4, instead of the bracket 21 and its ways I provide a swinging arm 23 pivotally connected to the body 10 of the vehicle as at 24, the outer end of said arm 23 being formed with a hook 25 adapted to engage the head 26 of the rod 18. A spring 27 connected at one end to the body 10 and at the other end to the swinging arm 23, exerts a constant tendency to swing the hooked end of the arm down. Therefore, when the head 26 is engaged with the hook 25 and the shoe 12 placed under the wheel 11, and the machine then started, the spring 27 causes a thrust to be exerted through the compound link 14, 15, 17, 18 which tends to push the shoe between the wheel and the ground in the same manner as described in connection with Fig. 1.

I do not limit myself to the sizes or proportions of parts or the specific details of construction illustrated and described, as many modifications might be made and still retain the essential characteristics of my invention such as the freedom from any connection with the wheel which would cause a threshing around or winding up when the wheel rotates, the automatic pushing of the shoe to aid its movement to effective position, and the automatic leaving of the shoe disconnected after it has done its work. Nor do I limit myself to the employment of a spring or springs to effect the pushing action of the shoe toward operative position, as the weight of the members 14 or 23 may alone be sufficient.

By the term "shoe" I mean to include any device or member that will act as a guide or platform onto which the wheel can ride to extricate it from its mired or inoperative position.

Having now described my invention, what I claim is:—

1. A shoe for coöperation with the wheel of a motor vehicle to facilitate starting the vehicle, means connected with said shoe for coupling it to the body of the vehicle, and means for exerting a pushing action on the shoe to tend to insert its rear edge between the wheel and the ground.

2. A shoe for coöperation with a wheel of a motor vehicle to facilitate starting the vehicle, said shoe being flat and stiff and having automatically separable means for connecting it with the body of the vehicle, and means for exerting a pushing action on the shoe to tend to insert its rear edge between the wheel and the ground.

3. The combination with a shoe for a wheel of a motor vehicle, of a link for connecting said shoe with the body of the vehicle, said link being pivotally connected with the shoe and vehicle body, and means for causing the link to exert a yielding pushing pressure on the shoe in a direction tending to insert its rear edge between said wheel and the ground.

In testimony whereof I have affixed my signature.

JOSEPH E. COTTER.

Copies of this patent may be obtained for five cents each, by addressing the "Commissioner of Patents, Washington, D. C."